United States Patent Office 3,376,336
Patented Apr. 2, 1968

3,376,336
PROCESS FOR THE MANUFACTURE OF SURFACE ACTIVE OLEFIN SULFONATES
Werner Stein, Erkrath-Unterbach, and Horst Baumann, Hilden, Rhineland, Germany, assignors to Henkel & Cie. G.m.b.H., Dusseldorf-Holthausen, Germany, a corporation of Germany
No Drawing. Filed Jan. 7, 1965, Ser. No. 424,142
Claims priority, application Germany, Mar. 12, 1964, H 52,029; Aug. 24, 1964, H 53,620
9 Claims. (Cl. 260—513)

ABSTRACT OF THE DISCLOSURE

A process is disclosed for preparing substantially color free olefin sulfonates which comprises sulfonating a hydrocarbon mixture composed of at least 90% $C_{8-22}$ olefins by the procedure of reacting the said olefin in a first stage with a sulfur trioxide-inert gas mixture and thereafter in a second stage completing the sulfonation by reacting the sulfonation product from the first stage with chlorosulfonic acid. The total amount of sulfonating agent employed in both stages amounts to 1.1 to 1.5 mols per mol of olefin; 0.65 to 1.05 mol of gaseous sulfur trioxide per mole of olefin being employed in the first stage and from 0.2 to 0.6 mol of chlorosulfonic acid per mol of olefin being utilized in the second stage. The final reaction product is thereafter hydrolyzed, the resulting product being a substantially color free olefin sulfonate.

---

This invention relates to a process for the multi-stage sulfonation of relatively long-chained olefins by means of gaseous sulfur trioxide and chlorosulfonic acid, followed by hydrolysis of the sulfonation products to form surface active olefin sulfonates.

United States Patents 2,061,617 to 2,061,620 and 2,094,451 have disclosed processes for sulfonating olefins by means of strong sulfonating agents, such as oleum, chlorosulfonic acid or sulfur trioxide in the presence of solvents, and then subjecting the reaction product to hydrolysis. These processes, however, have a number of disadvantages. For example, when oleum or chlorosulfonic acid is used, unsatisfactory degrees of sulfonation of less than 90% are obtained. Sulfonates with a high unsulfonated content are undesirable in the manufacture of washing or cleansing agents. It is difficult to process them in spray towers, and they do not display a satisfactory cleaning effect. Separation of the unreacted olefin from the sulfonate involves considerable technical difficulties and is uneconomical. When oleum is used, the reaction mixture, after sulfonation, still contains large amounts of unreacted sulfuric acid, which results in a high consumption of alkali in subsequent neutralization and alkaline hydrolysis, and in excessive salt contents in the end product.

If the olefins are sulfonated with chlorosulfonic acid alone, or with the substantially stronger working free sulfur trioxide, the sulfonation products occur as viscous, brownish black masses, which appear scarcely suitable for further industrial use.

In the processes disclosed by the above-cited United States patents and in the information published in the Journal of the American Chemical Society, vol. 76 (1954), page 3952, and in the Journal of the American Oil Chemists' Society, vol. 40 (1963), page 633, sulfonation of olefins is performed either with chlorosulfonic acid alone, or else with sulfur trioxide in the presence of inert solvents, and it is stressed that, in the absence of the solvents, a decomposition or polymerization of the olefin sets in. The recovery of the solvents used, which always entails losses and additional expense, and the necessity of a relatively large liquid throughput in the sulfonation process, nevertheless renders the said processes doubtfully economical.

It is therefore an object of the invention to overcome the difficulties of the prior art. More specifically it is an object of the invention to provide a method for sulfonating an olefin to an extent greater than 90% by sulfonating agents other than oleum and without the use of solvents. It is a further object of this invention to provide a sulfonation product initially having relatively lighter color as compared to the compounds prepared by prior art methods.

These and other objects have been achieved by the discovery that less strongly discolored olefin sulfonates can be obtained in a high yield without the use of solvents if the sulfonation of the hydrocarbon mixture, which contains at least 90% olefin with 8 to 22 carbon atoms in the molecule, is performed by using 0.65 to 1.05, and preferably 0.75 to 0.95 mol of sulfur trioxide diluted with inert gas per mol of olefin in a first sulfonation stage, and then, in a second sulfonation stage, 0.2 to 0.6 and preferably 0.3 to 0.5 mol of chlorosulfonic acid is used per mol of olefin, the total amount of sulfonating agent to be used amounting to 1.1 to 1.5 mols per mol of olefin.

The monoolefins serving as starting materials and having 8 to 22, preferably 10 to 20, and especially 12 to 18 carbon atoms in the molecule, or their mixtures, may be straight-chained or branched, and may also contain cycloaliphatic groups, providing a central or terminal double bond is present in the molecule and the unsaturated carbon atoms are not the starting point of a branched structure. These olefins, which can be manufactured in any desired manner, do not have to be entirely pure, i.e., they may also contain paraffins or diolefins in small amounts, not exceeding 10%, and preferably lower than 5%. Appropriate starting materials are, for example, the olefins obtained by the cracking of petroleum hydrocarbons, by the dehalogenation of alkyl halides, or by ethylene polymerization, which can be manufactured technically with a purity of at least 90% and preferably more than 95%.

The gaseous sulfur trioxide serving as the sulfonating agent in the first stage is used in a mixture with inert gases, the concentration of the sulfur trioxide being able to amount to 0.5 to 20 and preferably 1 to 10 percent by volume.

The inert gases are preferably air and nitrogen, although other inert gases are also suitable, such as carbon dioxide for example. The total amount of sulfur trioxide to be used is between 0.65 and 1.05 mols, and preferably 0.75 to 0.95 mol, of sulfur trioxide per mol of olefin.

After the use of the above-stated amount of sulfur trioxide, the reaction mixture still contains relatively large percentages of sulfonatable olefins. The additional sulfonation is performed in a second stage, wherein, instead of the sulfur trioxide, 0.2 to 0.6 and preferably 0.3 to 0.5 mol of chlorosulfonic acid is used. The total amount of sulfonating agent to be used is to amount to 1.1 to 1.5 mol of olefin. During the addition of the chlorosulfonic acid it is expedient to pump a strong current of air or inert gas through the reaction mixture, thereby substantially removing the hydrogen chloride that forms during the reaction. The pumping is advantageously continued for some time after all of the chlorosulfonic acid has been fed in. In this manner, it is possible to obtain the sulfonation product practically free of chloride ions.

The temperatures to be maintained during the sulfonation lie between 0 and 60° C., and depend on the olefins being used in each case. It is preferable to sulfonate terminal olefins between 10 and 40° C., and inside olefins between 0 and 30° C. The reaction is ordinarily sufficiently exothermic so that additional heating is unnecessary. In most cases it is necessary to remove excess reaction heat, and it is recommended to maintain the optimum temperature by appropriate cooling of the reaction vessels.

The reaction time depends substantially on the selected reaction conditions, such as temperature, concentration of the sulfonating agent, and the nature of the reaction apparatus, and amounts generally to from 5 to 120 minutes. Short reaction times can be achieved particularly when the reaction material is intensely agitated or sprayed by means of suitable mechanical devices, or if reaction apparatus is used which operates on the laminar flow or annular gap principle. The sulfonation can be performed continuously or discontinuously, depending on the nature of the apparatus used. In discontinuous procedures, the treatments with sulfur trioxide and chlorosulfonic acid can be performed successively in the same reaction vessel. It is expedient to perform the continuous sulfonation in two or more reaction vessels arranged in tandem, the sulfonation with sulfur trioxide being performed in the first reaction vessels, and the treatment with chlorosulfonic acid in the last reaction vessels.

The sulfonation is continued under the stated conditions until the sulfonation product, after hydrolysis and neutralization with alkalies, has become at least 92% water soluble. Since products can be made according to the invention with a content of at least 92% water-soluble olefin sulfonate, and preferably of 94% and more, separation of the unsulfonated portions is unnecessary. The sulfonation products manufactured according to the invention contain only traces of organically bound chlorine. Also, the chloride ion content can easily be brought below 0.5%, providing the hydrogen chloride that forms is removed in the above-described manner by pumping air or inert gas into the sulfonation mixture.

For the hydrolysis, the crude sulfonation product can be heated with water and excess acid or excess alkali at temperatures of 80 to 100° C., using such an amount of water that the crude sulfonation product is in a 5 to 75% solution. Usually 2 to 4 hours are required for hydrolysis at 100° C.

If the hydrolysis is performed in an acid medium, the amounts of sulfuric acid present in the crude sulfonation product normally suffice. If it is done in an alkaline solution, the amount of alkali that is added is such that, after the excess sulfonating agent has been saturated, enough alkali is available for the neutralization of the sulfonic acid that forms during hydrolysis. It is expedient to work with an excess, which can amount to as much as 20% of the amount of alkali theoretically required. The alkalies can be the hydroxides, carbonates or bicarbonates of sodium, potassium, magnesium or calcium, or organic bases such as the primary, secondary or tertiary amines or alkylolamines with 1 to 4 and preferably 2 carbon atoms per alkyl or alkylol radical.

If the hydrolysis is performed in the above-stated manner, a sulfonate mixture is obtained which consists mostly, i.e., 60 to 80% of hydroxy alkanesulfonates (Formula Examples I and II), and to a lesser extent of alkenesulfonates (Formula Examples III and IV):

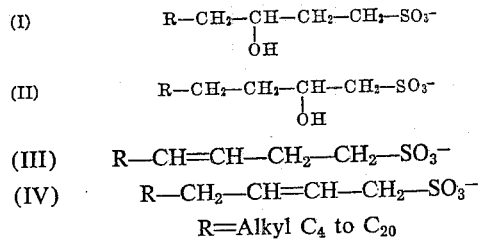

(III)     R—CH=CH—CH$_2$—CH$_2$—SO$_3^-$
(IV)     R—CH$_2$—CH=CH—CH$_2$—SO$_3^-$

R=Alkyl C$_4$ to C$_{20}$

Individual sulfonates may also be produced.

It has developed that the alkene sulfonates are superior for use in washing agents to the hydroxy-alkanesulfonates as regards their solubility and detergent properties. The percentage of the alkenesulfonates can be substantially increased by performing the hydrolysis at elevated temperature and pressure in an acid medium. In this preferred procedure, the crude olefin sulfonation products are heated to temperatures above 150° C. and preferably of 160 to 200° C., under pressure, in a 10 to 80% aqueous solution with a pH of 0 to 3. In that temperature range the complete hydrolysis takes only 5 to 30 minutes. An alkaline hydrolysis performed under the same conditions, however, results in no appreciable increase in the percentage of alkenesulfonates.

The acid hydrolysis at elevated temperature furthermore has the advantage that it increases the total yield of water-soluble olefin sulfonate above that obtainable by hydrolysis at 100° C., which is probably to be attributed to a hydrolysis of difficulty saponifiable residual substances, which takes place exclusively at a higher temperature. These substances, which are unsaponifiable at 100° C., and which can be separated for example by extracting the aqueous solution with organic solvents not miscible with water, are normally of no benefit to the washing process.

After the acid hydrolysis, the sulfonic acids can be neutralized by using the alkalies, alkaline earths or organic bases mentioned above. The aqueous solutions of the olefin sulfonic acid salts are light in color and can be used directly or be further processed in the customary manner.

If a still lighter colored sulfonation product is desired for certain purposes, a bleaching treatment can be performed with oxygenous bleaches. Since the olefin sulfonates obtained by the process of the invention contain but a small amount of colored by-products, they are characterized by good bleachability and a low bleach consumption. The hydrolysis and bleaching can also be performed simultaneously.

The following non-limiting examples are given as certain preferred embodiments of the invention and are not to be construed as narrowing the scope of the novel and inventive method and composition of the applicants.

The exact structure of the sulfonated olefins obtained is not known, except in terms of the physical properties and the steps involved in the method of manufacture both of which are held to extremely close limits by the present invention thereby permitting substantial duplication of the product from reaction to reaction.

The olefins whose processing is described in the following examples comprise 96 and 97 weight percent of terminal or interior aliphatic olefins. The rest comprises saturated hydrocarbons and small percentages of diolefins.

To determine the water-soluble olefin sulfonate content, a specimen of the hydrolyzed and neutralized mixture was extracted 4 to 5 times with the aliquot amount of benzine, a petroleum hydrocarbon, with a boiling point of 80 to 100° C., and after removing the extractant by distillation, the remaining, unsulfonated oil was weighed. The color values given were determined in a Lovibond tintometer with 5% aqueous solutions of the sulfonates in a 4-inch cell. Any unsulfonated amounts that might have been present were not figured as sulfonates.

Example 1

Two hundred and thirty two grams (1.0 mol) of a mixture of terminal C$_{14}$ to C$_{18}$ olefins (average chain length C$_{16}$) were sulfonated in a flask with a 2 liter capacity, which was equipped with a thermometer, a gas introduction tube reaching to the bottom of the flask, a gas outlet and an agitator. To this end, first 72 grams (0.9 mol) of sulfur trioxide were introduced during 45 minutes in the form of a 3 vol. percent mixture with air. Then, over a period of another 20 minutes, 41 grams (0.35 mol) of chlorosulfonic acid were dripped in, while a powerful air current of about 500 liters per hour was blown into the reaction mixture. A strong agitation was maintained during the sulfonation, and the reaction temperature was held to 20 to 30° C. by external cooling. After the chlorosulfonic acid had been fed in, the air stream was continued for another 5 minutes in order to completely drive off the hydrogen chloride that had formed. The $SO_3$ weight increase of the sulfonation product amounted to 97 grams (1.2 mol).

One hundred and sixty five grams of the product were diluted with a solution of 28 grams (0.7 mol) of sodium hydroxide in 300 ml. of water, and boiled for 3 hours using a reflux condenser. Another 160 grams of the crude sulfonation product was diluted with 300 ml. of water, and the very acidly reacting solution (pH about 1) was heated in the autoclave for 15 minutes at 190° C. The solutions obtained, which had been neutralized and adjusted to a concentration of 5% olefin sulfonate showed the following color values in the Lovibond tintometer:

Yellow _____ 17
Red _____ 3.3
Blue _____ 0

The alkenesulfonate content amounted to 39% with the alkaline hydrolysis, and to more than 75% in the acid hydrolysis. The yield of water-soluble olefin sulfonate ran around 93.1% of the initial amount of hydrocarbon in the case of the specimen hydrolyzed at 100° C., and around 95.2% in the case of hydrolysis under pressure. If one considers that the sulfonatable olefin content of the starting material amounts to about 96%, the yield is practically quantitative. The total chlorine content of the olefin sulfonate was less than 0.5% of the dry substance.

Example II

The process of example one was repeated however the introduction of air during the feeding of the chlorosulfonic acid was omitted, the total chlorine content rose to 3.3% of the dry substance, and at the same time the color numbers rose to yellow 21 and red 6.3, while there was an increase of 0.4 mol in the amount of caustic soda solution used. Thus, the significance of treating the reaction mixture with air at this stage can be seen.

Example III

In a test made for comparative purposes, 232 grams (1 mol) of the olefin used in Example 1 was sulfated in a single stage with 100 grams (1.25 mol) of sulfur trioxide in a 3 vol. percent mixture with air, in the manner stated above, and at a reaction temperature between 20 and 40° C. After hydrolysis at 100° C. and neutralization, a dark-colored sulfonate was obtained with a sulfonation percentage of 91.3%; the color numbers of this sulfonate in a 5% solution could not be measured since they were above the range of the tintometer (yellow>27, red>27, blue>27). The relationship between improved color and the two-stage process can thus be seen.

Example IV

In another comparative experiment, chlorosulfonic acid alone was used as the sulfonating agent: to 1 mol of the olefin used in Example 1, 146 grams (1.25 mol) of chlorosulfonic acid was added slowly for 60 minutes with agitation and cooling, at 20 to 30° C., while at the same time 500 liters of air were blown into the reaction mixture. After the addition of the acid had ended, the agitation and air blast was continued for another 10 minutes; then the crude, practically black sulfonate was hydrolyzed and neutralized in the above-described manner. The sulfonation percentage amounted to 78%; the color values were beyond the range of the tintometer (yellow>27, red>27, blue>27) and therefore were not measurable.

In comparison with Example 1, considerably darker colored olefin sulfonates were obtained in both of the comparative experiments III and IV and in the second experiment a poor degree of sulfonation was achieved. The great discoloration of the darker products is particularly expressed by the very high red and blue numbers.

Examples V to IX

In the examples given in the following table, Table I, the procedure was the same as in Example 1. Unless otherwise stated, the starting materials were isomeric mixtures of inside olefins with small percentages of terminal olefins. In the first sulfonation stage a 3 volume-percent sulfur trioxide-air mixture was used, and in the second stage chlorosulfonic acid and air were used. The reaction temperatures ran between 20 and 35° C., and the reaction times between 45 and 70 minutes. The hydrolysis was performed (a) after the addition of 1.1 mol of sodium hydroxide and 600 ml. of water by three hours of boiling with reflux, and (b) by 15 minutes of heating the crude sulfonation product, diluted with twice the amount of water, at 180° C. in the autoclave, followed by neutralization with caustic soda solution. The total chlorine content of the olefin sulfonates was in all cases less than 0.6% of the dry substance.

TABLE I

| Example No. | Starting Material | Olefin | $SO_3$ | $HSO_3Cl$ | Percent olefin sulfonate hydrolyzed (a) at 100° C. (b) at 180° C. | Color Values | | |
|---|---|---|---|---|---|---|---|---|
| | | | | | | Yellow | Red | Blue |
| V | $C_{14}$–$C_{18}$ olefin, avg. chain length $C_{16}$ 40% terminal 56% central. | 230 g. (1 mol) | 72 g. (0.9 mol) | 41 g. (0.35 mol) | (a) 93.4 (b) 95.6 | 18 | 6.5 | 0 |
| VI | $C_{16}$ olefin isomer mixture | 225 g. (1 mol) | 64 g. (0.8 mol) | 47 g. (0.4 mol) | (a) 92.6 (b) 94.9 | 18 | 3.3 | 0 |
| VII | $C_{16}$ olefin 96% terminal | 225 g. (1 mol) | 76 g. (0.95 mol) | 35 g. (0.3 mol) | (a) 93.8 (b) 95.8 | 18 | 5.9 | 0 |
| VIII | $C_{14}$ olefin isomer mixture | 210 g. (1 mol) | 68 g. (0.85 mol) | 58 g. (0.5 mol) | (a) 94.2 (b) 96.3 | 18 | 7.2 | 0 |
| IX | $C_{18}$ olefin | 253 g. (1 mol) | 60 g. (0.75 mol) | 47 g. (0.4 mol) | (a) 91.8 (b) 94.1 | 17 | 6.8 | 0 |

Example X

Instead of the cracking olefin used in Examples I to VI, 225 g. (1 mol) of hexadecene-1 were used, which had been obtained by Ziegler's ethylene polymerization, and which had the following characteristics: Iodine No. 112, total olefin content 97.1%, inside olefin content 1%, paraffin content 2.9%. The apparatus, the performance of the sulfonation and the hydrolysis of the sulfonation product were performed in the manner described in Example I. The yield of water-soluble olefin sulfonate amounted after 3 hours of hydrolysis at 100° C. to 94.8% of the starting material, and after a quarter hour of hydrolysis at 160° C. it was 96.5%. If the percentage of non-sulfonatable paraffins in the starting material is considered, the result is a practically quantitative yield of olefin sulfonate. The color values of 5% solutions determined with the Lovibond tintometer were: yellow 16, red 2, blue 0.

EXAMPLE XI

The following example describes a continuous method of operation. The sulfonating apparatus consisted of a proportioning device and four reaction Vessels I to IV of a capacity of 5 liters each. Each of the four vessels was equipped with two tubes extending down to the bottom of the vessel, one of which served for feeding the material to be sulfonated and the other for feeding gas, and with an exhaust pipe, an overflow pipe and a cooling jacket. The depth to which the individual vessels could be filled could be varied from 2 to 4 liters by means of the overflow tubes. The vessels were connected in tandem so that the partially sulfonated mixture coming from the overflow tube of Vessel I could run into Vessel II, and from there in like manner into Vessels III and IV. The finished sulfonated mixture was withdrawn from the overflow tube of Vessel IV. Vessels I and II represented the first sulfonation stage. No sulfonating agent was fed to the final vessel, which was used only to blow air through the sulfonated mixture so as to drive off the residual hydrogen chloride.

The starting material was a mixture of olefins having chain lengths of $C_{14}$ to $C_{18}$ (average chain length $C^{16.5}$) and an iodine number of 118. The above-described apparatus was filled with olefin and the content of the individual vessels was adjusted in each case to 3 liters of liquid. The proportioning device was used to feed continuously into the first reaction vessel 10 kg. (12.7 l.) of olefin per hour, this being equivalent to 43 mols of olefin per hour, and to feed simultaneously 0.5 mol of $SO_3$ into Vessel I, and 0.4 mol of $SO_3$ into Vessel II, in a 2 volume-percent dilution with air, for each mol of olefin. At the same time, 0.35 mol of chlorosulfonic acid per mol of olefin was pumped into Vessel III (second stage), and a current of air of 15 m.$^3$ per hour was simultaneously pumped into the same vessel.

A total of 1.25 mol of sulfonating agent was used per mol of the starting olefin. The removal of the residual hydrogen chloride was performed in Vessel IV by introducing an air flow of 10 m.$^3$ per second. All during the experiment, a temperature of 30 to 35° was maintained in Reaction Vesseles I and II, and a temperature of 25 to 30° C. was maintained in Reaction Vessel III, by means of appropriate cooling. The average time of stay of the reaction mixture in both of the sulfonation stages amounted to about 40 minutes. The product running from the last vessel, after the removal of first-runnings which were disregarded, was diluted, with cooling, with three times the amount of water (pH value of the solution: (1), and hydrolyzed in the autoclave by ¼ hour of heating at 160° C. The degree of sulfonation as determined by extraction of the unsulfonated portion amounted to 94.2% of the starting material. A 5% solution of the olefin sulfonate, hydrolyzed and neutralized with soda lye, gave the following color values in the Lovibond tintometer: yellow 18, red 2.1, blue 0. The total chlorine content of the olefin sulfonate was less than 1% of the dry substance.

EXAMPLE XII

The experimental arrangement, starting materials and procedure were the same as in Example XI, except that a total of 0.8 mol of $SO_3$ per mol of olefin was used in the first reaction stage, and 0.45 mol of chlorosulfonic acid per mol of olefin in the second reaction stage. Five tenths of a mol of $SO_3$ per mol of olefin was fed into Vessel I, and 0.3 mol into Vessel II. After hydrolysis at 160° C., the degree of sulfonation was 94.5%, and the total chlorine content in the olefin sulfonate was less than 1% of the dry substance. The following color values were measured in the Lovibond tintometer: yellow 19, red 2.9, blue 0.

Thus, there has been described a novel inventive and useful process for the sulfonation of 8 to 22 carbon atom olefins by $SO_3$ and chlorosulfonic acid in successive steps in a two-step process whereby the products obtained are comparatively lighter in color as compared to compounds prepared by prior art methods and as such are novel and inventive compositions which find utility as washing or cleansing agents as well as in equivalent applications.

Although the invention has been described with reference to certain preferred embodiments, it is not the intention of the applicants to be limited thereby and certain obvious modifications are intended to be included within the broad scope of the invention as embodied in the following claims.

What is claimed is:

1. Process for the manufacture of surface active olefin sulfonates which comprises sulfonating a hydrocarbon mixture containing at least 90% $C_{8-22}$ olefin in two stages, in the first stage said olefin is reacted at a temperature not exceeding 60° C. with 0.65 to 1.05 mol of gaseous sulfur trioxide per mol of olefin, said sulfur trioxide being present in a mixture thereof with an inert gas, the sulfur trioxide content of said mixture amounting to from 0.5 to 20% by volume and thereafter in a second stage reacting the sulfonation reaction mixture from said first stage at a temperature not exceeding 60° C. with 0.2 to 0.6 mols of chlorosulfonic acid per mol of olefin, the total amount of sulfonating agent amounting to from 1.1 to 1.5 mols per mol of olefin.

2. Process according to claim 1 where comprises subjecting the sulfonation product from said second stage to hydrolysis.

3. Process according to claim 1 wherein in said first stage 0.75 to 0.95 mol of sulfur trioxide are reacted per mol of olefin.

4. Process according to claim 1 wherein 0.3 to 0.5 mol of chlorosulfonic acid per mol of olefin are employed in said second stage.

5. Process according to claim 1 wherein said sulfur trioxide is present in said mixture with inert gas in an amount of from 1 to 10% by volume.

6. Process according to claim 1 which comprises the step of removing the hydrogen chloride produced in said second stage by passing an inert gas through said reaction mixture.

7. Process according to claim 1 wherein said first and second stages are effected at a temperature of from 0 to 40° C.

8. Process according to claim 2 which comprises effecting said hydrolysis at a temperature above 150° C. under pressure.

9. Process according to claim 8 wherein said hydrolysis is effected at a temperature of from 160° to 200° C.

References Cited

UNITED STATES PATENTS

| | | | |
|---|---|---|---|
| 2,061,617 | 11/1936 | Downing et al. | 260—513 |
| 2,278,064 | 3/1942 | de Simo et al. | 260—513 |
| 2,600,415 | 6/1952 | Mikeska | 260—513 |
| 2,977,292 | 3/1961 | Ellsworth | 203—4 |
| 3,164,608 | 1/1965 | Blaser | 260—327 |
| 3,164,609 | 1/1965 | Voss et al. | 260—327 |
| 3,235,549 | 2/1966 | Broussalian | 260—513 |
| 3,259,645 | 7/1966 | Brooks et al. | 260—505 |

LORRAINE A. WEINBERGER, *Primary Examiner.*

M. WEBSTER, *Assistant Examiner.*

UNITED STATES PATENT OFFICE
CERTIFICATE OF CORRECTION

Patent No. 3,376,336                               April 2, 1968

Werner Stein et al.

It is certified that error appears in the above identified patent and that said Letters Patent are hereby corrected as shown below:

Column 1, line 25, "mole" should read -- mol --. Column 2, line 58, after "mol" insert -- per mol --. Column 4, line 14, "difficulty" should read -- difficultly --; line 53, "100°" should read -- 110° --. Column 5, line 58, "sulfated" should read -- sulfonated --. Column 8, line 27, "where" should read -- which --.

Signed and sealed this 7th day of October 1969.

(SEAL)
Attest:

Edward M. Fletcher, Jr.                      WILLIAM E. SCHUYLER, JR.
Attesting Officer                             Commissioner of Patents